(12) United States Patent
Kim et al.

(10) Patent No.: US 11,131,897 B2
(45) Date of Patent: Sep. 28, 2021

(54) LIQUID CRYSTAL CELL

(71) Applicant: LG Chem, Ltd., Seoul (KR)

(72) Inventors: Deok Hwan Kim, Daejeon (KR); Yeon Keun Lee, Daejeon (KR); Jung Doo Kim, Daejeon (KR); Jun Haeng Lee, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/954,450

(22) PCT Filed: Dec. 20, 2018

(86) PCT No.: PCT/KR2018/016315
§ 371 (c)(1),
(2) Date: Jun. 16, 2020

(87) PCT Pub. No.: WO2019/125005
PCT Pub. Date: Jun. 27, 2019

(65) Prior Publication Data
US 2021/0080768 A1 Mar. 18, 2021

(30) Foreign Application Priority Data
Dec. 22, 2017 (KR) .................. 10-2017-0178108

(51) Int. Cl.
*G02F 1/137* (2006.01)
*G02F 1/1337* (2006.01)

(52) U.S. Cl.
CPC .......... *G02F 1/1375* (2013.01); *G02F 1/1337* (2013.01); *G02F 1/13712* (2021.01); *G02F 1/133742* (2021.01)

(58) Field of Classification Search
None
See application file for complete search history.

(56) References Cited

U.S. PATENT DOCUMENTS 4,005,928 A * 2/1977 Kmetz ................... B60R 1/088
349/195
2007/0273265 A1* 11/2007 Hikmet ..................... G02F 1/23
313/483

(Continued)

FOREIGN PATENT DOCUMENTS

JP H05150274 A 6/1993
JP H07104252 A 4/1995

(Continued)

OTHER PUBLICATIONS

International Search Report from Application No. PCT/KR2018/016314 dated Mar. 14, 2019, 2 pages.

(Continued)

*Primary Examiner* — Ryan Crockett
(74) *Attorney, Agent, or Firm* — Lerner, David, Littenberg, Krumholz & Mentlik, LLP (57) ABSTRACT

A liquid crystal cell and a manufacturing method thereof and a use thereof are provided in the present disclosure. The liquid crystal cell is in a normally transparent mode, and has excellent transmittance-variable characteristics in a transparent mode and a scattering mode and excellent haze characteristics in the scattering mode. Such liquid crystal cell may be applied to various light modulation devices, such as a smart window, a window protective film, a flexible display element, a light shielding plate for transparent displays, an active retarder for 3D image displays or a viewing angle control film.

13 Claims, 3 Drawing Sheets

(56) References Cited

U.S. PATENT DOCUMENTS

| | | | | |
|---|---|---|---|---|
| 2008/0203356 A1* | 8/2008 | Kjellander | ............... | G02B 1/04 |
| | | | | 252/299.01 |
| 2014/0336975 A1* | 11/2014 | Kim | ......................... | G01N 9/36 |
| | | | | 702/137 |
| 2015/0331264 A1* | 11/2015 | Min | ...................... | C07C 69/602 |
| | | | | 349/88 |
| 2017/0115438 A1* | 4/2017 | Choi | .................... | H01L 51/5281 |
| 2017/0336663 A1* | 11/2017 | Hakemi | ................. | C09K 19/02 |
| 2018/0163460 A1* | 6/2018 | Lin | ...................... | G02F 1/13475 |
| 2018/0373068 A1* | 12/2018 | Lim | .......................... | G02F 1/137 |
| 2019/0250465 A1* | 8/2019 | Kim | ................. | G02F 1/133711 |
| 2021/0116736 A1* | 4/2021 | Kim | .......................... | G02F 1/137 |

FOREIGN PATENT DOCUMENTS

| | | | |
|---|---|---|---|
| JP | 2003149683 A | 5/2003 | |
| KR | 20140077861 A | 6/2014 | |
| KR | 20160115428 A | 10/2016 | |
| KR | 20160117344 A | 10/2016 | |
| KR | 20170090236 A | 8/2017 | |
| TW | I609213 B | 12/2017 | |
| WO | 2016159671 A1 | 10/2016 | |

OTHER PUBLICATIONS

International Search Report from Application No. PCT/KR2018/016315 dated Mar. 14, 2019, 2 pages.
Extended European Search Report for Application No. 18893089.5 dated Oct. 28, 2020, 9 pages.

* cited by examiner

LIQUID CRYSTAL CELL

CROSS-REFERENCE TO RELATED APPLICATION

The present application is a national phase entry under 35 U.S.C. § 371 of International Application No. PCT/KR2018/016315 filed Dec. 20, 2018 which claims priority from Korean Patent Application No. 10-2017-0178108 filed on Dec. 22, 2017, the disclosures of which are incorporated herein by reference in their entirety.

TECHNICAL FIELD

This application relates to a liquid crystal cell, a manufacturing method thereof and a use thereof.

BACKGROUND ART

A normally transparent mode element is, for example, an element implementing the transparent mode in the absence of an external action, wherein it is switched to a black mode under the external action and switched back to the transparent mode when the external action is removed.

Patent Document 1 (Korean Laid-Open Patent Publication No. 10-2014-0077861) discloses a normally transparent mode element capable of varying between a transparent mode and a haze mode. The element of Patent Document 1 is a so-called PDLC (polymer dispersed liquid crystal) element implemented by dispersing liquid crystals in a polymer matrix, in which since a liquid crystal compound in the PDLC usually exists in an un-oriented state, it is in a scattering state when no voltage is applied, but implements the normally transparent mode by applying a vertical alignment film.

However, the normally transparent mode element using the PDLC of Patent Document 1 has a high driving voltage, and has problems such as residual haze level fluctuation and haze characteristic degradation depending on exposure characteristics, so that there is a need for development of the normally transparent mode element that can compensate for the above problems.

DISCLOSURE

Technical Problem

The present application provides a liquid crystal cell, which is in a normally transparent mode, and has excellent transmittance-variable characteristics in a transparent mode and a scattering mode, and excellent haze characteristics in the scattering mode, a manufacturing method thereof and a use thereof.

Technical Solution

The present application relates to a liquid crystal cell. Hereinafter, the liquid crystal cell of the present application will be described with reference to the accompanying drawings, where the accompanying drawings are exemplary, and the liquid crystal cell of the present application is not limited to the accompanying drawings.

Figure 1:
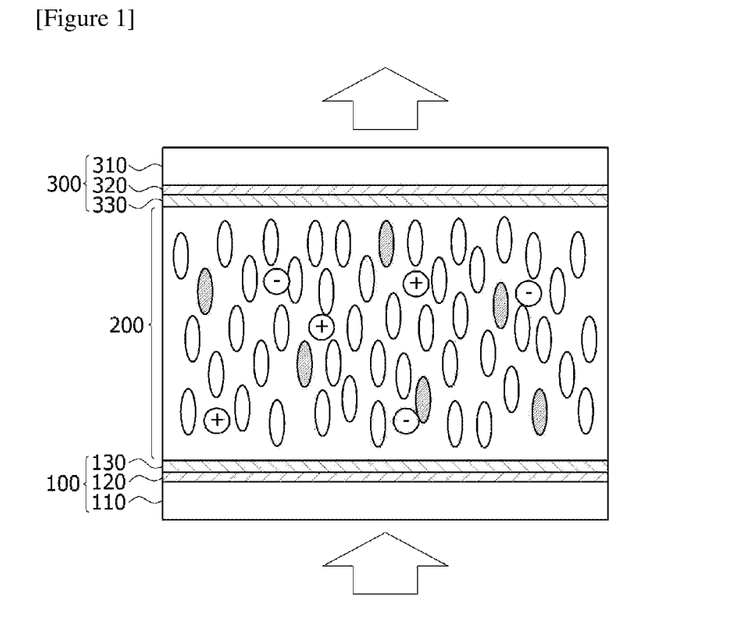
FIG. 1 is a diagram exemplarily showing a liquid crystal cell according to one example of the present application.

FIG. 1 exemplarily shows a liquid crystal cell according to one example of the present application. As shown in FIG. 1, the liquid crystal cell comprises two substrates (100, 300) disposed opposite to each other; and a liquid crystal layer (200) existing between the two substrates (100, 300).

The liquid crystal cell may implement a normally transparent mode element. In this specification, the term "normally transparent mode element" may mean an element which implements a transparent mode in a state where there is no external action (that is, an initial state or a normal state), and is switched to a scattering mode under the external action and switched back to the transparent mode when the external action is removed. In the present application, the term "external action" means all kinds of actions which are performed so that alignment of the liquid crystal compound can be changed, where a representative example is voltage application.

Figure 2:
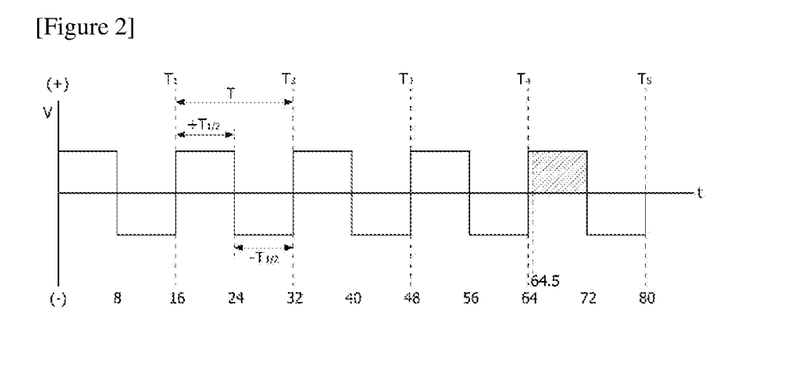
FIG. 2 is a graph exemplarily showing waveforms according to time of an alternating-current voltage applied when measuring a current density of a liquid crystal cell according to one example of the present application.

The liquid crystal layer (200) may exhibit a current density peak after 2 ms when measuring a current density over time. Specifically, the current density peak time point of the liquid crystal layer (200) may be after 2.1 ms, after 2.2 ms, after 2.3 ms, after 2.4 ms, after 2.5 ms, after 2.6 ms, or after 2.7 ms, and the upper limit of the current density peak time point of the liquid crystal layer (200) may be before 8 ms, before 6 ms, before 4 ms, or before 3 ms. In this specification, the "current density" means an amount of an electric current flowing through a unit area, and in this specification, the "current density peak" means a time having the maximum value of current density values after 0.5 ms. That is, current density measurements earlier than 0.5 ms can be ignored. FIG. 2 exemplarily shows waveforms according to time of an alternating-current voltage applied when measuring a current density of a liquid crystal cell according to one example of the present application. As shown in FIG. 2, when an alternating-current voltage is applied according to the time (t), a positive half cycle ($+T_{1/2}$) that a voltage has a positive (+) value and a negative half cycle ($-T_{1/2}$) that a voltage has a negative (−) value may be repeated to form a cycle (T). In this specification, the "cycle" means a period (T) in which a specific voltage is applied at the time of applying an alternating-current voltage. The current density may be a value measured in a fifth cycle ($T_5$), which is a time point when it is determined to have been stabilized, as the current density tends to be over-measured when measured immediately after application of an alternating-current voltage. The current density peak time point of the liquid crystal layer (200) according to one example may mean a time having values measured during the positive half cycle from 64 ms (milliseconds) to 72 ms, that is, the fifth cycle after applying an alternating-current voltage at a voltage of 40 V and any one frequency of 20 Hz to 120 Hz, preferably a frequency of 60 Hz to the liquid crystal cell. The after 0.5 ms means after 0.5 ms when the start point of the positive half cycle in the fifth cycle is 0 ms.

As the liquid crystal layer (200) satisfies the current density peak point in the above-described range, it is possible to provide a liquid crystal cell having excellent transmittance-variable characteristics in a transparent mode and a scattering mode and excellent haze characteristic in the scattering mode. The current density peak time point of the liquid crystal layer (200) may be adjusted according to the composition of the liquid crystal layer (200) or the heating time.

In one example, when a predetermined voltage or more is applied to the liquid crystal cell, rotational force is generated in non-reactive liquid crystals due to an induced electric field action caused by polarization of a conductivity control agent included in the liquid crystal layer (200) with the applied external electric field, whereby swirling currents may occur. In order to generate the swirling currents, the conductivity control agent should have a concentration higher than or equal to a predetermined level, where the concentration of the conductivity control agent may be evaluated as an average current density.

For example, the liquid crystal layer (200) may have an average current density of 30 µA/cm² to 60 µA/cm². Specifically, the lower limit of the average current density in the liquid crystal layer (200) may be 33 µA/cm² or more, 36 µA/cm² or more, 39 µA/cm² or more, or 40 µA/cm² or more, and the upper limit of the average current density in the liquid crystal layer (200) may be 59 µA/cm² or less, 58 µA/cm² or less, 57 µA/cm² or less, or 56 µA/cm² or less. In this specification, the "average current density" means an average value of current densities measured for a specific time after applying a voltage having a specific intensity and frequency to a liquid crystal cell. The average current density of the liquid crystal layer (200) according to one example may be an average value of current densities measured during the positive half cycle in the fifth cycle after applying an alternating-current voltage at a voltage of 40 V and any one frequency of 20 Hz to 120 Hz to the liquid crystal cell. As the liquid crystal layer (200) satisfies the average current density within the above-described range, it is possible to provide a liquid crystal cell which has excellent transmittance-variable characteristics in a transparent mode and a scattering mode, and excellent haze characteristics in the scattering mode. When the average current density of the liquid crystal layer (200) is too low, the concentration of the conductivity control agent is low, so that the swirling currents of the conductivity control agent are not sufficiently generated, and thus the haze characteristics may be lowered. In addition, when the average current density of the liquid crystal layer (200) is too high, the haze characteristics may be excellent, but the difference between the transmittance in the initial state and the transmittance upon application of a voltage of 60 V may decrease, which may adversely affect enlargement of the liquid crystal cell area. The average current density of the liquid crystal layer (200) may be adjusted according to the composition of the liquid crystal layer (200) or the heating time.

The current density may be measured by a semiconductor characteristic analyzer, and the current density according to one embodiment has been measured using a DSLC cell Keithly 4200 semiconductor characteristic analyzer. The driving waveform of the semiconductor characteristic analyzer may have a period of 0.0010 sec to 0.0300 sec, a pulse width of 0.00500 sec to 0.01000 sec, a rise time of 0.00001 sec to 0.00020 sec, a fall time of 0.00001 sec to 0.00020. sec, a base voltage of −60 V to −20 V, and an amplitude of 50 V to 100 V. Specifically, the driving waveform of the semiconductor characteristic analyzer may have a period of 0.0100 sec to 0.0250 sec or 0.0150 sec to 0.0200 sec, a pulse width of 0.00600 sec to 0.00950 sec, 0.00700 sec to 0.00900 sec or 0.00800 sec to 0.00850 sec, a rise time of 0.00004 sec to 0.00016 sec or 0.00008 sec to 0.00012 sec, a fall time of 0.00004 sec to 0.00016 sec or 0.00008 sec to 0.00012 sec, a base voltage of −55 V to −25 V, −50 V to −30 V or −45 V to −35 V, and an amplitude of 60 V to 95 V, 70 V to 90 V or 75 V to 85 V.

The period means a time taken for a single reciprocating movement to take place around the vibration center in a vibration phenomenon or for fluctuation of a physical value to occur once. The pulse width means an interval at the time when the amplitude becomes ½ in the rise time and the fall time of a pulse. The rise time means a time between 10% and 90% of the maximum value during the period when a pulse wave increases from the minimum value to the maximum value. The fall time means a time during which the pulse wave reaches from 90% to 10% of the maximum value during the period when it reaches from the maximum value to the minimum value. The base voltage means a voltage at 0 seconds before applying a specific voltage upon measuring a current density. The amplitude means a distance or displacement that moves maximally from the center of vibration when there is periodic vibration.

The liquid crystal layer (200) may comprise non-reactive liquid crystals. The non-reactive liquid crystals in the liquid crystal layer (200) may perform a function of varying transmittance by changing an orientation depending on whether or not an external action, for example, an external voltage is applied. As the non-reactive liquid crystals, all kinds of liquid crystal compounds may be used as long as their orientation can be changed by application of an external action. For example, a smectic liquid crystal compound, a nematic liquid crystal compound or a cholesteric liquid crystal compound may be used as the liquid crystal compound. In addition, the liquid crystal compound may be, for example, a compound having no polymerizable group or crosslinkable group so that the orientation direction thereof can be changed by application of an external action.

In one example, the non-reactive liquid crystals may have negative dielectric constant anisotropy. In this specification, the term "dielectric constant anisotropy (Δε)" may mean a difference (ε//−ε⊥) between the horizontal dielectric constant (ε//) and the vertical dielectric constant (ε⊥) of liquid crystals. In this specification, the term "horizontal dielectric constant (ε//)" means a dielectric constant value measured along the direction of an electric field in a state where a voltage is applied so that the director of the liquid crystal and the direction of the electric field by the applied voltage are substantially horizontal, and the "vertical dielectric constant (ε⊥)" means a dielectric constant value measured along the direction of an electric field in a state where a voltage is applied so that the director of the liquid crystal and the direction of the electric field by the applied voltage are substantially perpendicular.

The absolute value of the dielectric constant anisotropy (Δε) of the non-reactive liquid crystals may be, for example, in a range of about 1 to 20. The lower limit of the absolute value of the dielectric constant anisotropy (Δε) of the non-reactive liquid crystals may be 1 or more, 2 or more, or 3 or more, and the upper limit of the absolute value of the dielectric constant anisotropy (Δε) of the non-reactive liquid crystals may be 20 or less, 19 or less. 18 or less, 17 or less, 16 or less, 15 or less, 14 or less, 13 or less, 12 or less, 11 or less, 10 or less, 9 or less, 8 or less, 7 or less, 6 or less, or 5 or less. In one example, the non-reactive liquid crystal may have an absolute value of dielectric constant anisotropy of first non-reactive liquid crystals of 1 to 5, 1 to 4 or 2 to 4, and may have an absolute value of dielectric constant anisotropy of second non-reactive liquid crystals of 3 to 7, 4 to 7 or 4 to 6. When the dielectric constant anisotropy of the non-reactive liquid crystals satisfies the above range, it is advantageous in implementing a liquid crystal cell switching between a transparent mode and a scattering mode, because it can be driven with a low driving voltage and exhibit excellent haze characteristics.

The refractive index anisotropy of the non-reactive liquid crystals may be appropriately selected in consideration of the desired physical properties, for example, the haze characteristics of the liquid crystal cell. In the present application, the term "refractive index anisotropy" may mean a difference between an ordinary refractive index and an extraordinary refractive index of non-reactive liquid crystals. The extraordinary refractive index may mean a refractive index with respect to the optical axis of the non-reactive liquid crystal, and the ordinary refractive index may mean a refractive index with respect to a direction perpendicular to the optical axis of the non-reactive liquid crystal. In the refractive index anisotropy of the liquid crystal compound, for example, the lower limit may be 0.1 or more, 0.12 or more, 0.13 or more, 0.14 or more, 0.15 or more, 0.16 or more, 0.17 or more, or 0.18 or more, and the upper limit may be 0.3 or less, 0.29 or less, 0.28 or less, 0.27 or less, 0.26 or less, 0.25 or less, 0.24 or less, 0.23 or less, 0.22 or less, 0.21 or less, or 0.2 or less. In one example, in the non-reactive liquid crystals, the first non-reactive liquid crystals may have refractive index anisotropy of 0.1 to 0.3, 0.15 to 0.25 or 0.18 to 0.19, and the second non-reactive liquid crystals may have refractive index anisotropy of 0.1 to 0.3, 0.15 to 0.25 or 0.19 to 0.20. When the refractive index anisotropy of the non-reactive liquid crystals satisfies the above range, it is possible, for example, to implement a normally transparent mode element having excellent haze characteristics. Also, in this specification, the term "optical axis" may mean an axis in the long axis direction of a liquid crystal when the liquid crystal is in the shape of a rod, and may mean an axis in the normal direction of the plane of a disc when the liquid crystal is in a disc shape.

The liquid crystal layer (200) may further comprise a conductivity control agent. According to one example of the present application, the liquid crystal layer (200) may be a liquid crystal layer driven in a dynamic scattering mode. The dynamic scattering mode may mean a liquid crystal mode inducing an electrohydrodynamic instability (EHDI) state. In general, the dynamic scattering mode liquid crystal layer comprises non-reactive liquid crystals in a nematic or smectic phase and a conductivity control agent that induces EHDI, and when an electric field is applied to the liquid crystal layer (200), convection occurs by the EHDI, and when the electric field is increased, new convection structures are successively created, whereby the light is strongly scattered by optical anisotropy and fluid motion of the liquid crystals, while changing into the final turbulence.

In one example, when the conductivity control agent is included in the liquid crystal layer (200), the conductivity control agent may be included in a ratio of 0.1 parts by weight to 30 parts by weight relative to 100 parts by weight of the non-reactive liquid crystals. Specifically, the conductivity control agent may be included in a ratio of 0.1 parts by weight to 25 parts by weight, 0.1 parts by weight to 20 parts by weight, 0.1 parts by weight to 15 parts by weight or 0.1 parts by weight to 10 parts by weight relative to 100 parts by weight of the non-reactive liquid crystals. By comprising the conductivity control agent in the ratio of the above-described range in the liquid crystal layer (200), it is also possible to maintain the physical properties of the liquid crystal layer while showing excellent haze characteristics.

The conductivity control agent that induces the EHDI may comprise, for example, one or more selected from an anisotropic dye, a reactive monomer and an ionic compound. The reactive monomer may be reactive liquid crystals. In one example, the liquid crystal cell may comprise an anisotropic dye and reactive liquid crystals, as the conductivity control agent, in the liquid crystal layer (200), and in another example, the liquid crystal cell may comprise an anisotropic dye, reactive liquid crystals and an ionic compound, as the conductivity control agent, in the liquid crystal layer (200).

The anisotropic dye may contribute to the transmittance variation by improving a light shielding ratio of the liquid crystal cell. In this specification, the term "dye" may mean a material capable of intensively absorbing and/or modifying light within at least a part or all of the entire range in a visible light region, for example, a wavelength range of 400 nm to 700 nm. Furthermore, in this specification, the term "anisotropic dye" may mean a material capable of anisotropic absorption of light in at least a part or the entire range of the visible light region. As the anisotropic dye, for example, a known dye known to have the characteristics that can be aligned according to the alignment state of the liquid crystal can be selected and used, and for example, a black dye can be used. Such a black dye is known, for example, as an azo dye or an anthraquinone dye, but is not limited thereto.

When the anisotropic dye is included in the liquid crystal layer (200), the anisotropic dye may be included in a ratio of 0.1 parts by weight to 2 parts by weight relative to 100 parts by weight of the non-reactive liquid crystals. Specifically, the anisotropic dye may be included in a ratio of 0.1 parts by weight to 1.8 parts by weight, 0.1 parts by weight to 1.6 parts by weight, 0.1 parts by weight to 1.4 parts by weight, 0.1 parts by weight to 1.2 parts by weight, 0.1 parts by weight to 1.0 part by weight or 0.1 parts by weight to 0.8 parts by weight relative to 100 parts by weight of the non-reactive liquid crystals. By comprising the anisotropic dye in the ratio of the above-described range in the liquid crystal layer (200), it is possible to contribute to the transmittance variation by improving the light shielding ratio of the liquid crystal element.

As the reactive monomer, reactive liquid crystals having good mixing properties with the liquid crystals may be used as described above, and the reactive liquid crystals may be referred to as a reactive mesogen. In this specification, the reactive mesogen may mean a compound containing a moiety capable of exhibiting liquid crystal, for example, a mesogen skeleton, and also one or more reactive functional groups. The reactive functional group may be exemplified by, for example, a polymerizable functional group or a crosslinkable functional group. The reactive functional group may be exemplified by an acryloyl group, an acryloyloxy group, a methacryloyl group, a methacryloyloxy group, a carboxyl group, a hydroxy group, a vinyl group, an epoxy group and the like, but is not limited thereto, which may include known functional groups known as polymerizable groups. The reactive mesogen may include a polyfunctional reactive mesogen or a monofunctional reactive mesogen. In this specification, the term "polyfunctional reactive mesogen" may mean a compound containing two or more reactive functional groups of the mesogens. In one example, the polyfunctional reactive mesogen may comprise 2 to 10, 2 to 8, 2 to 6, 2 to 5, 2 to 4, 2 to 3 or 2 reactive functional groups. In addition, the term "monofunctional reactive mesogen" may mean a compound containing one reactive functional group of the mesogens.

When the reactive monomer is included in the liquid crystal layer (200), the reactive monomer may be included in a ratio of 0.5 parts by weight to 25 parts by weight relative to 100 parts by weight of the non-reactive liquid crystals. Specifically, the reactive monomer may be included in a ratio of 0.5 parts by weight to 20 parts by weight, 0.5 parts by weight to 15 parts by weight, 0.5 parts by weight to 12 parts by weight, 0.5 parts by weight to 10 parts by weight, 0.5 parts by weight to 6 parts by weight or 0.5 to 5 parts by weight relative to 100 parts by weight of the non-reactive liquid crystals. By comprising the reactive monomer in the above-described range ratio in the liquid crystal layer (200), it is possible to exhibit an excellent average current density as compared to the liquid crystal cell that does not contain a reactive monomer in the liquid crystal layer.

In this specification, the ionic compound may mean a compound in the form of a salt in which ions having opposite charges, for example, a cation and an anion, are formed by an ionic bond. The ionic compound may be electrically neutral. Such an ionic compound may be exemplified by, for example, a nitrogen-containing onium salt, a sulfur-containing onium salt or a phosphorus-containing onium salt, and the like, but is not limited thereto. Specifically, an ionic impurity, an ionic liquid or a salt may be used as the ionic compound, and for example, 2,2,6,6-tetramethylpiperidine-1-oxy free radical may be used as the ionic impurity; $TMAPF_6$ (trimethylaluminum-hexafluorophosphate) or $BMIN-BF_4$ ([1-butyl-3-methylimideazolium]$BF_4$) may be used as the ionic liquid; and CTAB (cetrimonium bromide), CTAI (cetrimonium iodide) or $CTAI_3$ (cetrimonium triiodide) may be used as the salt.

When the ionic compound is included in the liquid crystal layer (200), the ionic compound may be included in a ratio of 0.1 parts by weight to 2 parts by weight relative to 100 parts by weight of the non-reactive liquid crystals. Specifically, the ionic compound may be included in a ratio of 0.1 parts by weight to 1.5 parts by weight, 0.1 parts by weight to 1.2 parts by weight, 0.1 parts by weight to 1.0 parts by weight or 0.1 parts by weight to 0.5 parts by weight relative to 100 parts by weight of the non-reactive liquid crystals. By comprising the ionic compound in the ratio of the above-described range in the liquid crystal layer (200), it is possible to effectively secure the conductivity of the liquid crystal layer, where the ionic compound may comprise a small amount of the above-described range in consideration of the solubility in the liquid crystal compound.

In one example, when the liquid crystal layer (200) comprises both a reactive monomer and an ionic compound, the weight ratio of the reactive monomer and the ionic compound may be 5:1 to 200:1. Specifically, the weight ratio of the reactive monomer and the ionic compound may be 5:1 to 180:1, 5:1 to 150:1, 5:1 to 130:1, 5:1 to 100:1, 5:1 to 80:1, 5:1 to 50:1, 5:1 to 30:1, or 5:1 to 10:1. By comprising the ionic compound in the ratio of the above-described range in the liquid crystal layer (200), it is possible to form a liquid crystal layer having excellent physical properties while effectively securing conductivity.

The liquid crystal cell may switch between a transparent mode and a scattering mode by adjusting the initial alignment state of the non-reactive liquid crystals and applying an external action such as a voltage. For example, when the non-reactive liquid crystals are present in a vertically aligned state, the liquid crystal cell may exhibit the transparent mode, and when the non-reactive liquid crystals are present in an irregularly arranged state, the liquid crystal cell may exhibit the scattering mode.

In this specification, the term "scattering mode" may mean a mode in which a liquid crystal cell exhibits haze in a predetermined level or more, and the term "transparent mode" may mean a state in which light can be transmitted or a mode in which it exhibits haze in a predetermined level or less.

For example, in the scattering mode, the liquid crystal cell may have haze of 10% or more, 15% or more, 20% or more, 25% or more, 30% or more, 35% or more, 40% or more, 45% or more, 50% or more, 55% or more, 60% or more, 65% or more, 70% or more, 75% or more, 80% or more, 85% or more, 90% or more, or 95% or more. In the transparent mode, the liquid crystal cell may have, for example, haze of less than 10%, 8% or less, 6% or less, or 5% or less.

The haze may be a percentage of the transmittance of the diffused light to the transmittance of the total transmitted light passing through a measurement object. The haze can be evaluated using a haze meter (NDH-5000SP). The haze can be evaluated in the following manner using the haze meter. That is, the light is transmitted through the measurement object and is incident into an integrating sphere. In this process, the light is divided into diffused light (DT) and parallel light (PT) by the measurement object, and these lights are reflected in the integrating sphere and collected by a light receiving element, and the haze can be measured through the collected light. That is, the total transmitted light (TT) by the process is the sum (DT+PT) of the diffused light (DT) and the parallel light (PT), and the haze can be defined as a percentage of the diffused light to the total transmitted light (Haze (%)=100×DT/TT).

The liquid crystal cell may be in a transparent mode in a state where no external action is applied, and may be switched to a scattering mode when an external action is applied. The liquid crystal cell may exist in a state where the liquid crystal layer (200) is vertically oriented when no external action is applied.

Figure 3:
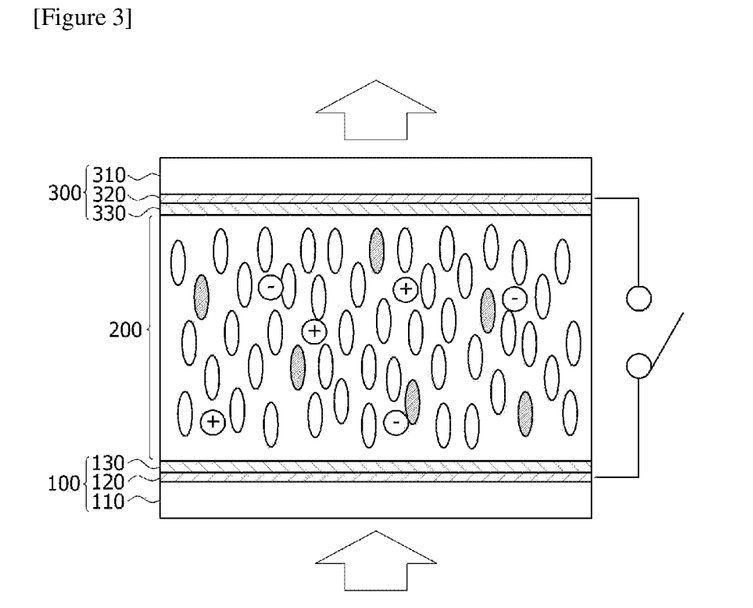
FIG. 3 is a diagram exemplarily showing a liquid crystal cell implementing a transparent mode in an initial state according to one example of the present application.
Figure 4:
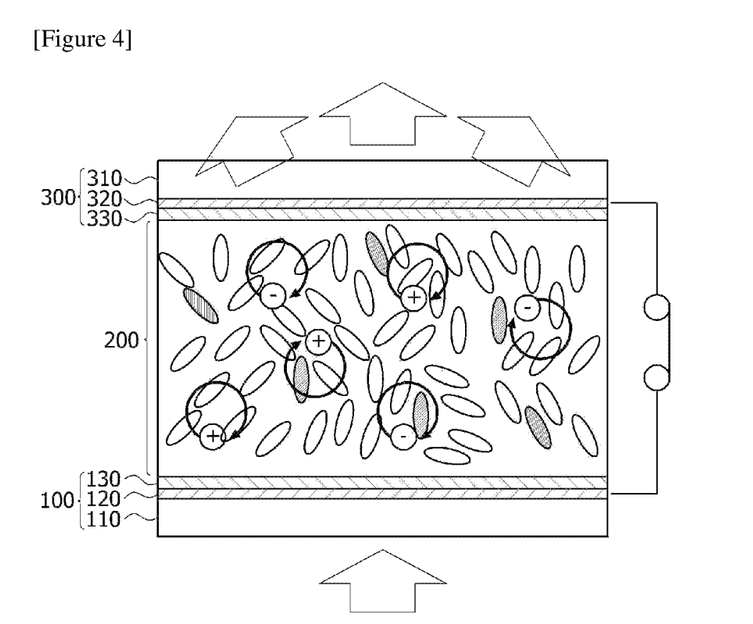
FIG. 4 is a diagram exemplarily showing a liquid crystal cell implementing a scattering mode when a voltage is applied according to one example of the present application.

FIGS. 3 and 4 exemplarily show each driving of a transparent mode and a scattering mode in a liquid crystal cell of the present application. As shown in FIG. 3, in the initial state, that is, the state in which no external action is applied, the non-reactive liquid crystals may exist in a state vertically oriented to the plane of the liquid crystal layer (200), and may implement the transparent mode (A). When an external action, for example a vertical electric field, is applied in this initial state, as shown in FIG. 4, the non-reactive liquid crystals may be switched to the scattering mode (B) while having an irregular arrangement state by the EHDI caused by the conductivity control agent. Here, when the vertical electric field is removed, it may be switched to the transparent mode of the initial state. In one example, the switching from the transparent mode to the scattering mode can be performed, for example, by applying a vertical electric field of about 1 to 500 Hz or about 1 to 100 Hz, which may also be appropriately changed as necessary, for example, in consideration of haze characteristics.

In one example, the liquid crystal layer (200) may have a difference between the transmittance in the initial state and the transmittance at the time of applying a voltage of 60 V of 40% or more. Hereinafter, in this specification, the "difference between the transmittance in the initial state and the transmittance at the time of applying a voltage of 60 V" has been defined as a transmittance-variable width. Specifically, the transmittance-variable width of the liquid crystal layer (200) may be 41% or more, or 42% or more, and the upper limit of the transmittance-variable width of the liquid crystal layer (200) may be 45% or less. As the liquid crystal layer (200) has an excellent transmittance-variable width within the above range, the liquid crystal cell may have excellent driving characteristics.

For example, the transmittance of the liquid crystal layer (200) in the initial state may be 60% to 95%, and specifically, the transmittance of the liquid crystal layer (200) in the initial state may be 60% to 90%, 60% to 80% or 60% to 70%. In addition, the transmittance of the liquid crystal layer (200) at the time of applying a voltage of 60 V may be 15% to 50%, and specifically, the transmittance of the liquid crystal layer (200) at the time of applying a voltage of 60 V may be 15% to 45%. 15% to 35% or 15% to 25%.

The liquid crystal layer (200) may express haze by a difference in refractive indexes between domains of the non-reactive liquid crystals present in the liquid crystal layer (200) when a voltage of 60 V is applied. The refractive index means a refractive index for light having a wavelength of about 550 nm, unless otherwise specified.

For example, the liquid crystal layer (200) may have haze of 90% or more when a voltage of 60 V is applied. Specifically, the haze of the liquid crystal layer (200) at the time of applying a voltage of 60 V may be 91% or more, 92% or more, 93% or more, or 94% or more, and the upper limit of the haze of the liquid crystal layer (200) at the time of applying a voltage of 60 V may be 98% or less. The liquid crystal layer (200) has haze in the aforementioned range when a voltage of 60 V is applied, whereby the liquid crystal cell may have excellent light shielding characteristics in a scattering mode.

In addition, the liquid crystal layer (200) may have haze of 9% or less in an initial state. Specifically, the haze of the liquid crystal layer (200) in the initial state may be 8% or less, 6% or less, or 5% or less, and the lower limit of the haze of the liquid crystal layer (200) in the initial state may be 0.5% or more. The liquid crystal layer (200) has haze in the aforementioned range in the initial state, whereby the liquid crystal cell may have excellent transmission characteristics in a normally transparent mode.

The two substrates (100, 300) may comprise electrode layers (120, 320) and vertical alignment films (130, 330), respectively. Specifically, the two substrates (100, 300) may sequentially comprise base materials (110, 310), and electrode layers (120, 320) and vertical alignment films (130, 330) on the base materials (110, 310), respectively.

As the base materials (110, 310), those having optical transparency can be used. For example, as the base materials (110, 310), glass or a plastic film or sheet, which is optically transparent, can be used. Specifically, the plastic film or sheet can be exemplified by a cellulose film or sheet such as a DAC (diacetyl cellulose) or TAC (triacetyl cellulose) film or sheet; a COP (cycloolefin copolymer) film or sheet such as a norbornene derivative resin film or sheet; an acrylic film or sheet such as a PMMA (poly(methyl methacrylate)) film or sheet; a PC (polycarbonate) film or sheet; an olefin film or sheet such as a PE (polyethylene) or PP (polypropylene) film or sheet; a PVA (polyvinyl alcohol) film or sheet; a PES (poly ether sulfone) film or sheet; a PEEK (polyether ether ketone) film or sheet; a PEI (polyetherimide) film or sheet; a PEN (polyethylenenaphthatate) film or sheet; a polyester film or sheet such as a PET (polyethyleneterephtalate) film or sheet; a PI (polyimide) film or sheet; a PSF (polysulfone) film or sheet; a PAR (polyarylate) film or sheet; or a fluorine-based resin film or sheet, and the like, and generally, a cellulose film or sheet, a polyester film or sheet, or an acrylic film or sheet, and the like can be used, and preferably, a TAC film or sheet can be used, but it can be suitably selected in consideration of the purpose of the present application.

The electrode layers (120, 320) may apply an electric field to the liquid crystal layer (200) to switch the alignment state of the liquid crystal layer (200). As the electrode layers (120, 320), a transparent conductive layer may be used. For example, as the electrode layers (120, 320), one formed by depositing a conductive polymer, a conductive metal, a conductive nanowire or a metal oxide such as ITO (indium tin oxide), and the like may be used. In one example, indium tin oxide (ITO) may be used as the electrode layers (120, 320).

As the vertical alignment films (130, 330), any alignment film having vertical alignment capability to an adjacent liquid crystal layer may be selected without particular limitation. For example, a contact alignment film such as a rubbing alignment film or an alignment film, which comprises a photo-alignment film compound, known to be capable of exhibiting orientation characteristics by a non-contact method such as irradiation of linearly polarized light can be used.

The present application also relates to a method for manufacturing a liquid crystal cell. The method for manufacturing a liquid crystal cell relates to, for example, the manufacturing method for manufacturing the above-described liquid crystal cell. Therefore, the contents described in the liquid crystal cell may be equally applied to the details of the method for manufacturing a liquid crystal cell, which are described below. The liquid crystal cell manufactured by the above method may be in a normally transparent mode, and may have excellent transmittance-variable characteristics in the transparent mode and the scattering mode, and excellent haze characteristics in the scattering mode.

The method for manufacturing a liquid crystal cell of the present application relates to a liquid crystal cell comprising two substrates disposed opposite to each other and a liquid crystal layer existing between the two substrates. The method for manufacturing a liquid crystal cell may be a method for manufacturing the above-described liquid crystal cell.

The method for manufacturing a liquid crystal cell may comprise a step of adjusting the liquid crystal layer so that a current density peak appears after 2 ms. However, the current densities are values measured during a positive half cycle in the fifth cycle after applying an alternating-current voltage at a voltage of 40 V and any one frequency of 20 Hz to 120 Hz to the liquid crystal cell, and the current density peak means a time having the maximum value of current density values after 0.5 ms. By adjusting the current density peak time point of the liquid crystal layer in the above-described range, the liquid crystal cell satisfies the above-described average current density range, whereby it can have excellent transmittance-variable characteristics in the transparent mode and the scattering mode, and excellent haze characteristics in the scattering mode.

If the step of adjusting the average current density peak time point of the liquid crystal layer as described above is included, the liquid crystal cell may be manufactured by a known method without particular limitation, and in one example, the liquid crystal cell may be manufactured by injecting the heated liquid crystal composition between two substrates and sealing the edges.

As the method of adjusting a current density peak time point of the liquid crystal layer, a method of appropriately selecting compositions and contents included in the liquid crystal composition and adjusting heating conditions may be applied.

In one example, when the liquid crystal composition comprises non-reactive liquid crystals, and an anisotropic dye and reactive liquid crystals as a conductivity control agent, the current density peak time point of the liquid crystal layer can be adjusted in the above-described range by heating the liquid crystal composition at a temperature of 100° C. to 120° C. for 25 hours to 30 hours. Specifically, when the liquid crystal composition comprises non-reactive liquid crystals, and an anisotropic dye and reactive liquid crystals as a conductivity control agent, the current density peak time point of the liquid crystal layer can be adjusted in the above-described range by heating the liquid crystal composition at a temperature of 103° C. to 117° C., 106° C. to 114° C. or 109° C. to 111° C. for 26 hours to 30 hours, 27 hours to 30 hours, 28 hours to 30 hours or 29 hours to 30 hours. By heating the composition under the above-described conditions to adjust the current density peak time point of the liquid crystal layer in the above-mentioned range, the liquid crystal cell satisfies the above-described average current density range, whereby it can have excellent transmittance-variable characteristics in the transparent mode and the scattering mode, and excellent haze characteristics in the scattering mode.

In another example, when the liquid crystal composition comprises non-reactive liquid crystals, and an anisotropic dye, reactive liquid crystals and an ionic compound as a conductivity control agent, and the reactive liquid crystals are included in an amount of 2.5 wt % to 7.5 wt %, the current density peak time point of the liquid crystal layer can be adjusted in the aforementioned range by heating the liquid crystal composition at a temperature of 100° C. to 120° C. for 30 minutes to 15 hours. Specifically, when the liquid crystal composition comprises non-reactive liquid crystals, and an anisotropic dye, reactive liquid crystals and an ionic compound as a conductivity control agent, and the reactive liquid crystals are included in an amount of 2.5 wt % to 7.5 wt %, the current density peak time point of the liquid crystal layer can be adjusted in the aforementioned range by heating the liquid crystal composition at a temperature of 103° C. to 117° C., 106° C. to 114° C. or 109° C. to 111° C. for 40 minutes to 14 hours, 50 minutes to 13 hours or 1 hour to 12 hours. By heating the composition under the above-described conditions to adjust the current density peak time point of the liquid crystal layer in the above-mentioned range, the liquid crystal cell satisfies the above-described average current density range, whereby it can have excellent transmittance-variable characteristics in the transparent mode and the scattering mode, and excellent haze characteristics in the scattering mode.

In another example, when the liquid crystal composition comprises non-reactive liquid crystals, and an anisotropic dye, reactive liquid crystals and an ionic compound as a conductivity control agent, and the reactive liquid crystals are included in an amount of 7.5 wt % to 12.5 wt %, the current density peak time point of the liquid crystal layer can be adjusted in the aforementioned range by heating the liquid crystal composition at a temperature of 100° C. to 120° C. for 30 minutes to 4 hours. Specifically, when the liquid crystal composition comprises non-reactive liquid crystals, and an anisotropic dye, reactive liquid crystals and an ionic compound as a conductivity control agent, and the reactive liquid crystals are included in an amount of 7.5 wt % to 12.5 wt %, the current density peak time point of the liquid crystal layer can be adjusted in the aforementioned range by heating the liquid crystal composition at a temperature of 103° C. to 119° C., 106° C. to 118° C., 109° C. to 117° C., 112° C. to 116° C. or 114° C. to 115° C. for 1 hour to 3 hours or 1 hour and a half to 2 hours. By heating the composition under the above-described conditions to adjust the current density peak time point of the liquid crystal layer in the above-mentioned range, the liquid crystal cell satisfies the above-described average current density range, whereby it can have excellent transmittance-variable characteristics in the transparent mode and the scattering mode, and excellent haze characteristics in the scattering mode.

The present application also relates to a use of the liquid crystal cell. An exemplary liquid crystal cell may be in a normally transparent mode, and may have excellent transmittance-variable characteristics in a transparent mode and a scattering mode, and excellent haze characteristics in the scattering mode. Such liquid crystal cell may be applied to various light modulation devices such as a smart window, a window protective film, a flexible display element, a light shielding plate for transparent displays, an active retarder for 3D image displays or a viewing angle control film.

Advantageous Effects

The present application can provide a liquid crystal cell which is in a normally transparent mode, and has excellent transmittance-variable characteristics in the transparent mode and a scattering mode and excellent haze characteristics in the scattering mode, and a method for manufacturing the liquid crystal cell. Such liquid crystal cell may be applied to various light modulation devices such as a smart window, a window protective film, a flexible display element, a light shielding plate for transparent displays, an active retarder for 3D image displays or a viewing angle control film.

BEST MODE

Hereinafter, the present application will be described in detail with reference to Examples, but the scope of the present application is not limited by the following Examples.

Example 1

Manufacture of Liquid Crystal Cell

After two glass substrates, in which ITO (indium tin oxide) transparent electrode layers and vertical alignment films were sequentially formed, were disposed apart from each other so that the vertical alignment films faced each other and the interval was about 9 μm or so, a liquid crystal composition heated at 110° C. for 30 hours was injected between the two glass substrates disposed apart from each other and the edges were sealed to manufacture a liquid crystal cell having an area of 2.5 cm×3.0 cm and an interval of 9 μm.

Here, the vertical alignment film was produced by coating a vertical alignment composition (Nissan 5661) on the ITO transparent electrode layer and baking it at a temperature of 100° C. for 10 minutes. As shown in Table 1 below, the liquid crystal composition was prepared by mixing commercial liquid crystals LC1 (HNG740600-100, manufactured by HCCH) having dielectric constant anisotropy of −3.1 and refractive index anisotropy of 0.188, an anisotropic dye (X12, manufactured by BASF) and 4-methoxylphenyl 4-((6-(acryloyloxy)hexyl)oxy) benzoate (HCM-021, manufactured by HCCH) as reactive liquid crystals at a weight ratio of 90:1.3:5 (LC1: anisotropic dye: RM).

Examples 2 to 3 and Comparative Examples 1 to 3

Manufacture of Liquid Crystal Cell

Liquid crystal cells were manufactured in the same manner as in Example 1, except that the compositions of the liquid crystal composition and the heating conditions were changed as in Table 1 below.

Example 4

Manufacture of Liquid Crystal Cell

A liquid crystal cell was manufactured in the same manner as in Example 1, except that as the liquid crystal composition, commercial liquid crystals LC2 (HCCH 7262, manufactured by HCCH) having dielectric constant anisotropy of −5.0 and refractive index anisotropy of 0.1995, an anisotropic dye (X12, manufactured by BASF), 4-methoxyphenyl 4-((6-(acryloyloxy)hexyl)oxy) benzoate (HCM-021, manufactured by HCCH) as reactive liquid crystals and CTAB (cetyltrimethylammonium bromide) as an ionic compound, as shown in Table 1 below, were mixed at a weight ratio of 90:1.4:10:1 (LC2: anisotropic dye: RM: CTAB).

TABLE 1

| | Liquid crystal composition (weight ratio) | | | | |
|---|---|---|---|---|---|
| | Non-reactive liquid crystals | | Conductivity control agent | | Heating |
| | LC1 | LC2 | Anisotropic dye | RM | CTAB | conditions |
| Example 1 | 90 | — | 1.3 | 5 | — | 110° C., 30 hours |
| Example 2 | 90 | — | 1.3 | 5 | 1 | 110° C., 1 hour |
| Example 3 | 90 | — | 1.3 | 5 | 1 | 110° C., 12 hours |
| Example 4 | — | 90 | 1.4 | 10 | 1 | 115° C., 2 hours |
| Comparative Example 1 | 90 | — | 1.3 | 5 | 1 | 60° C., 4 hours |
| Comparative Example 2 | 90 | — | 1.3 | — | 1 | 25° C., 4 hours |
| Comparative Example 3 | — | 90 | 1.4 | 10 | 1 | 115° C., 6 hours |

Figure 5:
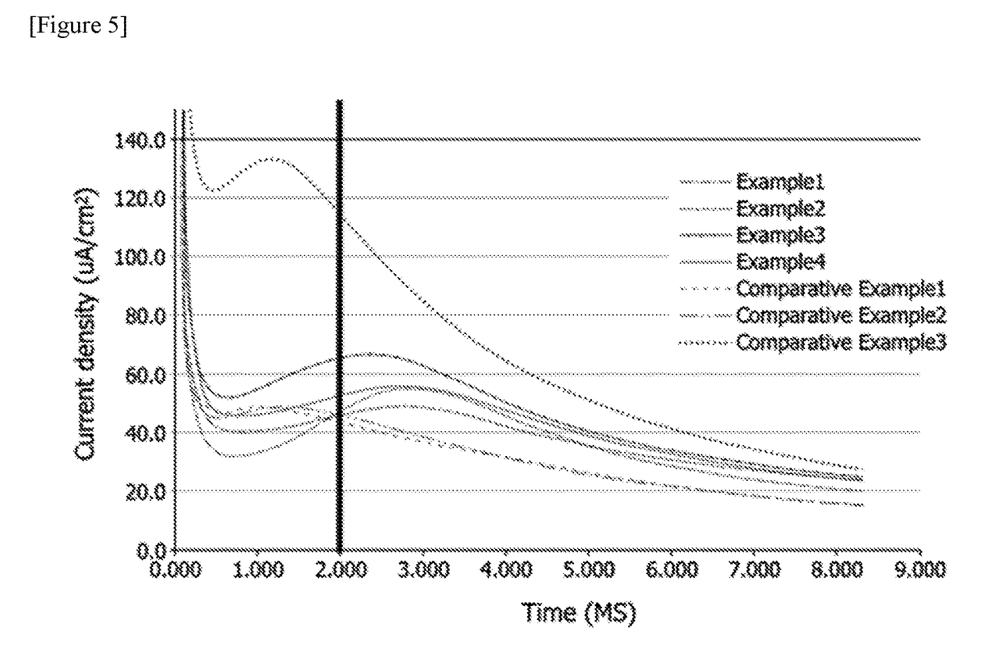
FIG. 5 is graphs measuring current densities of liquid crystal cells manufactured in Examples and Comparative Examples according to voltage application times.

LC1: commercial liquid crystals (HNG740600-100, manufactured by HCCH)
LC2: commercial liquid crystals (HCCH 7262, manufactured by HCCH)
Anisotropic dye: X12, manufactured by BASF
RM (reactive liquid crystals): 4-methoxyphenyl 4-((6-(acryloyloxy)hexyl)oxy)benzoate (HCM-021, manufactured by HCCH)
CTAB: cetyltrimethylammonium bromide Evaluation Example 1. Current Density Evaluation For liquid crystal cells manufactured in Examples and Comparative Examples, the instantaneous current-voltage (I-V) was measured using a semiconductor characteristic analyzer, Keithly 4200, having a driving waveform shown in Table 2 below. Specifically, currents flowing at the time of applying an alternating-current voltage of 40 V and 60 Hz to two substrates disposed opposite to each other in the liquid crystal cells manufactured in Examples and Comparative Examples were measured and shown in FIG. 5. At this time, the current value measured after the fifth cycle (Cycle) was taken for stabilization. After voltage application, the current at 8 ms divided by the area was called the final current density, and the average value of the current densities measured from 0 ms to 8 ms was defined as the average current density. The current density peak time point appearing upon the current density measurement and the average value of the measured current densities were shown in Table 3 below. In this case, the current density peak means the maximum value of the current density values after 0.5 ms.

TABLE 2

| DSLC cell Keithly 4200 driving waveform (60 Hz, 40 V, square waveform) | | |
|---|---|---|
| | Value | Unit |
| Period | 0.0167 | Sec |
| Pulse Width | 0.00833 | Sec |
| Rise Time | 0.0001 | Sec |
| Fall Time | 0.0001 | Sec |
| Base Voltage | −40 | Volt |
| Amplitude | −80 | Volt |

Evaluation Example 2. Haze and Transmittance Evaluation

For the liquid crystal cells manufactured in Examples and Comparative Examples, haze and transmittance were measured by an ASTM method using a haze meter, NDH-5000SP. Specifically, AC power was connected to two substrates disposed opposite to each other so as to apply a vertical electric field to each of the liquid crystal cells manufactured in Examples and Comparative Examples, and the haze in the transparent mode at the time of applying no initial voltage and the scattering mode applying a voltage of 60 V and 60 Hz was measured and shown in Table 3 below. In addition, the transmittance in the transparent mode at the time of applying no initial voltage (0 V) and the transmittance in the scattering mode applying a voltage of 60 V and 60 Hz were measured as the transmittance, and then the difference between them was defined as the transmittance-variable width, as shown in the following equation 1, and shown in Table 3 below.

$$\text{Transmittance-variable width} = T_0 - T_{60} \quad \text{[Equation 1]}$$

In Equation 1 above, $T_0$ is transmittance at the time of applying no initial voltage (0V), and $T_{60}$ means transmittance at the time of applying a voltage of 60 V and 60 Hz.

TABLE 3

|  | Peak time point (ms) | Average current density (μA/cm²) | Initial (0 V) | | 60 V | | Transmittance-variable width (%) |
|---|---|---|---|---|---|---|---|
|  |  |  | Transmittance (%) | Haze (%) | Transmittance (%) | Haze (%) |  |
| Example 1 | 2.781 | 44.9 | 66.4 | 1.6 | 26.4 | 95.3 | 40.0 |
| Example 2 | 2.781 | 45.8 | 64.6 | 1.9 | 22.7 | 95.2 | 41.9 |
| Example 3 | 2.336 | 54.2 | 64.4 | 1.9 | 22.2 | 95.5 | 42.2 |
| Example 4 | 2.695 | 49.5 | 67.8 | 0.7 | 26.6 | 95.7 | 41.2 |
| Comparative Example 1 | 0.977 | 40.3 | 66.5 | 1.8 | 26.5 | 79.5 | 40.0 |
| Comparative Example 2 | 1.138 | 41.0 | 63.6 | 1.6 | 23.4 | 74.7 | 40.2 |
| Comparative Example 3 | 1.113 | 79.8 | 67.9 | 1.0 | 30.3 | 95.1 | 37.6 |

As shown in Table 3 above, it was confirmed that the liquid crystal cells manufactured in Examples 1 to 4 in which the current density peak appeared after 2 ms expressed excellent haze in the scattering mode and simultaneously had excellent transmittance-variable widths as compared to the liquid crystal cells manufactured in Comparative Examples 1 and 2 in which the current density peak appeared before 2 ms.

EXPLANATION OF REFERENCE NUMERALS

100, 300: substrate
110, 310: base material
120, 320: electrode layer
130, 330: vertical alignment film
200: liquid crystal layer

The invention claimed is:

1. A liquid crystal cell comprising:
two substrates disposed opposite to each other; and
a liquid crystal layer present between the two substrates, wherein the liquid crystal layer comprises non-reactive liquid crystals and a conductivity control agent, wherein the conductivity control agent is included in a ratio of 0.1 parts by weight to 30 parts by weight relative to 100 parts by weight of the non-reactive liquid crystals, wherein upon measuring current densities over time, a current density peak appears after 2 ms, wherein the current densities are measured during a positive half cycle after a fifth cycle and the current densities are measured by applying an alternating-current voltage at a first voltage of 40 V and a frequency of 20 Hz to 120 Hz to the liquid crystal cell, and the current density peak is a maximum value of the current densities appeared after 0.5 ms.

2. The liquid crystal cell according to claim 1, wherein the non-reactive liquid crystals have negative dielectric constant anisotropy.

3. The liquid crystal cell according to claim 1, wherein the conductivity control agent comprises one or more selected from an anisotropic dye, reactive liquid crystals or an ionic compound.

4. The liquid crystal cell according to claim 1, wherein the liquid crystal layer has a transparent mode in an initial state and a scattering mode at the time of applying a second voltage.

5. The liquid crystal cell according to claim 4, wherein the liquid crystal layer has a difference of 40% or more between transmittance in the initial state and transmittance at the time of applying the second voltage of 60 V.

6. The liquid crystal cell according to claim 4, wherein the liquid crystal layer has haze of 90% or more at the time of applying the second voltage of 60 V.

7. The liquid crystal cell according to claim 1, wherein the two substrates each comprise an electrode layer and a vertical alignment film.

8. An optical modulation device comprising the liquid crystal cell of claim 1.

9. A method for manufacturing a liquid crystal cell comprising two substrates disposed opposite to each other and a liquid crystal layer present between the two substrates, wherein the method comprises:
heating a liquid crystal composition at a temperature of 100° C. to 120° C., and
injecting the heated liquid crystal composition between the two substrates to form the liquid crystal cell, wherein upon measuring current densities of the liquid crystal layer over time, a current density peak appears after 2 ms, wherein the current densities are measured during a positive half cycle after a fifth cycle and the current densities are measured by applying an alternating-current voltage at a voltage of 40 V and a frequency of 20 Hz to 120 Hz to the liquid crystal cell, and the current density peak is a maximum value of the current densities appeared after 0.5 ms.

10. The method for manufacturing the liquid crystal cell according to claim 9, further comprising sealing the edges of the heated liquid crystal composition injected between the substrates.

11. The method for manufacturing the liquid crystal cell according to claim 10, wherein the heated liquid crystal composition comprises non-reactive liquid crystals and a conductivity control agent, wherein the conductivity control agent comprises an anisotropic dye and reactive liquid crystals, wherein the heated liquid crystal composition is heated for 25 hours to 30 hours.

12. The method for manufacturing the liquid crystal cell according to claim 10, wherein the heated liquid crystal composition comprises:
non-reactive liquid crystals; and
a conductivity control agent, wherein the conductivity control agent comprises an anisotropic dye, reactive liquid crystals and an ionic compound, and when the reactive liquid crystals are included in an amount of 2.5 wt % to 7.5 wt % in the liquid crystal composition, and the heated liquid crystal composition is heated for 30 minutes to 15 hours.

13. The method for manufacturing the liquid crystal cell according to claim 10, wherein the heated liquid crystal composition comprises:

non-reactive liquid crystals and a conductivity control agent comprising an anisotropic dye, reactive liquid crystals and an ionic compound, and when the reactive liquid crystals are included in an amount of 7.5 wt % to 12.5 wt % in the liquid crystal composition, the heated liquid crystal composition is heated for 30 minutes to 4 hours.

\* \* \* \* \*